United States Patent [19]

Hosan et al.

[11] Patent Number: 4,973,097

[45] Date of Patent: Nov. 27, 1990

[54] CONSTRUCTION ASSEMBLY INCLUDING A GAS SPRING

[75] Inventors: Hans-Josef Hosan, Neuwied; Bernd Körtgen, Adenau; Castor Fuhrmann, Brachtendorf, all of Fed. Rep. of Germany

[73] Assignee: Stabilus GmbH, Koblenz-Neuendorf, Fed. Rep. of Germany

[21] Appl. No.: 324,568

[22] Filed: Mar. 16, 1989

[30] Foreign Application Priority Data

Mar. 23, 1988 [DE] Fed. Rep. of Germany ....... 3809712

[51] Int. Cl.⁵ ............................................. B62D 25/10
[52] U.S. Cl. .................................. 296/76; 180/69.21; 292/78; 292/338; 16/278; 16/1 C; 188/300; 267/64.12; 267/120
[58] Field of Search ................. 296/76, 56; 180/69.21; 188/300; 267/64.12, 120; 16/278, 376, 66, 1 C, 343; 292/78, 338

[56] References Cited
U.S. PATENT DOCUMENTS 3,716,945 2/1973 Cooper et al. ................... 296/56 X
4,679,841 7/1987 Taunay .............................. 296/76

FOREIGN PATENT DOCUMENTS 0170049 6/1985 European Pat. Off. .
2353888 5/1974 Fed. Rep. of Germany .
2619176 11/1977 Fed. Rep. of Germany .
2942800 5/1980 Fed. Rep. of Germany .

Primary Examiner—Dennis H. Peder
Attorney, Agent, or Firm—Brumbaugh, Graves, Donohue & Raymond

[57] ABSTRACT

A gas spring is provided in an illustrational example between a framework and a trunk cover of a motor vehicle for compensating for the weight of the trunk cover during movement of said trunk cover. The gas spring is hinged to the framework and to the trunk cover. For eliminating the spring force action on the hinge between the trunk cover and the gas spring in the closed position of the trunk cover, the part of the gas spring hinged to the trunk cover is supported on the framework, when the trunk cover is in its closed position. Alternately, the gas spring is locked when the trunk cover is in its closed position.

11 Claims, 5 Drawing Sheets

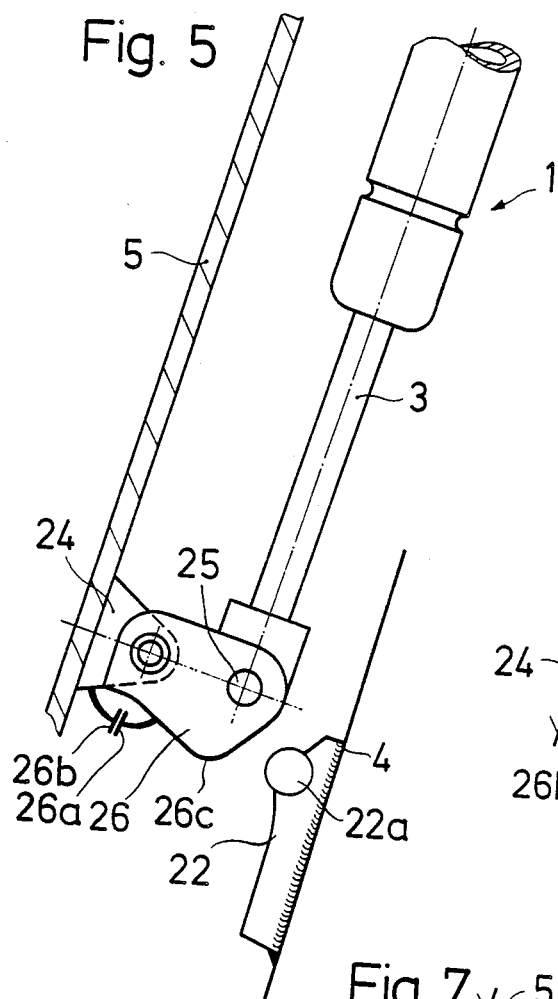
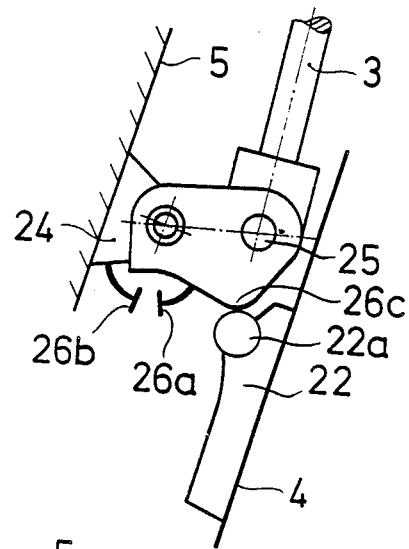
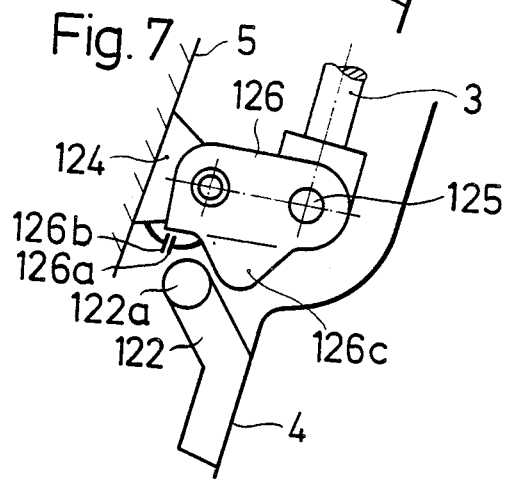

CONSTRUCTION ASSEMBLY INCLUDING A GAS SPRING

BACKGROUND OF THE INVENTION

A gas spring may be used for compensating the weight of a movable construction element, for example a trunk cover, in a motor vehicle. In the closed position of the trunk cover, the spring force of the gas spring acts onto the connection means between the two parts of the gas spring on the one hand, and the framework and the trunk cover on the other hand.

THE PRIOR ART

From German Offenlegungsschrift No. 26 19 176 a gas spring is known in which the spring force is eliminated in the closed condition of the trunk cover. Locking means are provided in this gas spring which become effective after a predetermined inward movement of the piston rod into the cylinder and a subsequent short outward movement. The inward movement of the piston rod can be effected by the closing movement of the trunk cover. It is, however, difficult to effect the subsequent outward movement, which is additionally necessary for locking the gas spring, i.e. for suppressing the spring force thereof.

OBJECT OF THE INVENTION

It is an object of the present invention to make sure that after closing of the trunk cover the forces acting on the hinges of the gas spring and at least onto the hinge between the gas spring and the trunk cover, are eliminated.

SUMMARY OF THE INVENTION

A construction assembly comprises a basic construction unit. A movable construction element is pivotally mounted on said basic construction unit about a horizontal axis and is pivotally movable between a first terminal position and a second terminal position. At least one gas spring having an axis is provided. This gas spring includes two gas spring components, namely a cylinder and a piston rod. A first one of said gas spring components is connected to said basic construction unit by first connection means. A second one of said gas spring components is connected to said movable construction element by second connection means. Said gas spring acts with its spring force on said construction element such as to compensate for at least a part of the weight of said construction element during its movement between said first terminal position and said second terminal position. Reaction forces of said gas spring occur in said first and in said second connection means.

In view of the above-mentioned object, reaction force control means are provided on said basic construction unit for cooperation with said gas spring in response to said construction element approaching said first terminal position such as to at least partially eliminate said reaction force on said connection means when said construction element is in said first terminal position.

According to the present invention, the connection means between the gas spring and the construction element is under no load or under reduced load when the trunk cover is closed. According to certain embodiments of the present invention also the connection means between gas spring and basic construction unit may be discharged or at least partially discharged.

The discharging of the connection means between the gas spring and the construction element is of high importance in cases in which, e.g., in a motor vehicle construction where the gas spring acts on a trunk cover, the construction element is of light and highly deformable design and in cases in which the construction element is eccentrically loaded by only one gas spring.

According to a first principle of the present invention, the reaction force control means comprise reaction force support means mounted on said basic construction unit such as to support at least part of said reaction force acting on said second connection means in said first terminal position.

According to this principle, at least the second connection means are subjected to reduced load in the first terminal position because at least part of the spring force is directly introduced into the basic construction unit in said first terminal position.

In order to distribute the spring force partially on the second connection means and partially on the basic construction unit with a major part of the spring force acting on the framework, elastic force transmission means may be provided between said reaction force support means and said second gas spring component.

When using such elastic force transmission means said reaction force support means may comprise a first abutment member fixed with respect to said basic construction unit. A second abutment member is then provided on said second gas spring component. Said second abutment member is elastically supported on said second gas spring component by said elastic force transmission means. Said first and said second support members engage each other in response to said construction element approaching said first terminal position, such that said elastic force transmission means are stressed as a response to said engagement of said first and second abutment members.

According to a further embodiment again using such elastic transmission means, said reaction force support means comprise a first abutment member elastically supported on said basic construction unit by said elastic force transmission means. Then a second abutment member is fixed on said second gas spring component. Said first and second abutment members engage each other in response to said construction element approaching said first terminal position. Then said elastic force transmission means are stressed in response to said engagement of said first and second abutment members.

At least one of said first and second abutment members may be provided with a sloped abutment face providing a smooth progressive engagement of said first and second abutment members in response to said construction element approaching said first terminal position.

In order to obtain symmetrical force distribution with respect to the axis of the gas spring, the second abutment member is arranged such as to surround said second gas spring component and said first abutment member is U-shaped with a slot receiving said second gas spring component in said first terminal position.

A complete discharge of the second connection means may be obtained by using second connection means which permit a limited movement of said second gas spring component substantially along the axis of said gas spring with respect to said construction element. This limited movement is in such case limited by stop members of said second connection means and said construction element, which stop members are engaged with each other. During movement of the construction element between its first an its second position, the stop members engage each other so that the spring force acts on the construction element. When, however, the construction element approaches the first terminal position, the reaction force support means act on said second gas spring component such as to disengage said stop members.

According to another principle of the present invention the reaction force control means act on a locking system of said gas spring such as to suppress the spring force of said gas spring in response to said construction member approaching said first terminal position.

The locking system may be constructed in different ways, for example, such that said locking system is lockable in response to a predetermined inward movement of said piston rod with respect to said cylinder. In this case, the reaction force control means act on said second gas spring component such as to cause said predetermined inward movement of said piston rod with respect to said cylinder in response to said construction element approaching said first terminal position.

If the locking system becomes effective only when a predetermined outward movement of said piston rod has occurred after such a predetermined inward movement, (see German Offenlegungsschrift No. 26 19 176), the second connection means and the reaction force control means may comprise mutually engageable engagement members which engage each other before said construction element enters into said first terminal position such as to cause said predetermined inward movement, and disengage again when said construction element arrives at said first terminal position so as to permit said predetermined outward movement.

Preferably, said second gas spring component is said piston rod.

As mentioned above, said basic construction unit may be the framework of a motor vehicle and the movable construction element is one of a construction element and an engine hood of said motor vehicle.

The various features of novelty which characterize the present invention are pointed out with particularity in the claims annexed to and forming a part of this disclosure. For a better understanding of this invention, its operating advantages and specific objects attained by its use, reference should be had to the accompanying drawings and descriptive matter in which there are illustrated and described preferred embodiments of the invention.

BRIEF DESCRIPTION OF THE DRAWINGS

The invention will be explained in greater detail hereinafter with reference to the embodiments shown in the accompanying drawings, in which:

FIG. 5 shows a connection between the gas spring and the construction element according to a third embodiment shortly before the construction element arrives at its fully closed position;

FIG. 6 shows the embodiment of FIG. 5 when the trunk cover has arrived at its fully closed position;

FIG. 7 shows the connection between the gas spring and the trunk cover according to a fourth embodiment.

DESCRIPTION OF THE PREFERRED EMBODIMENTS

Figure 1:
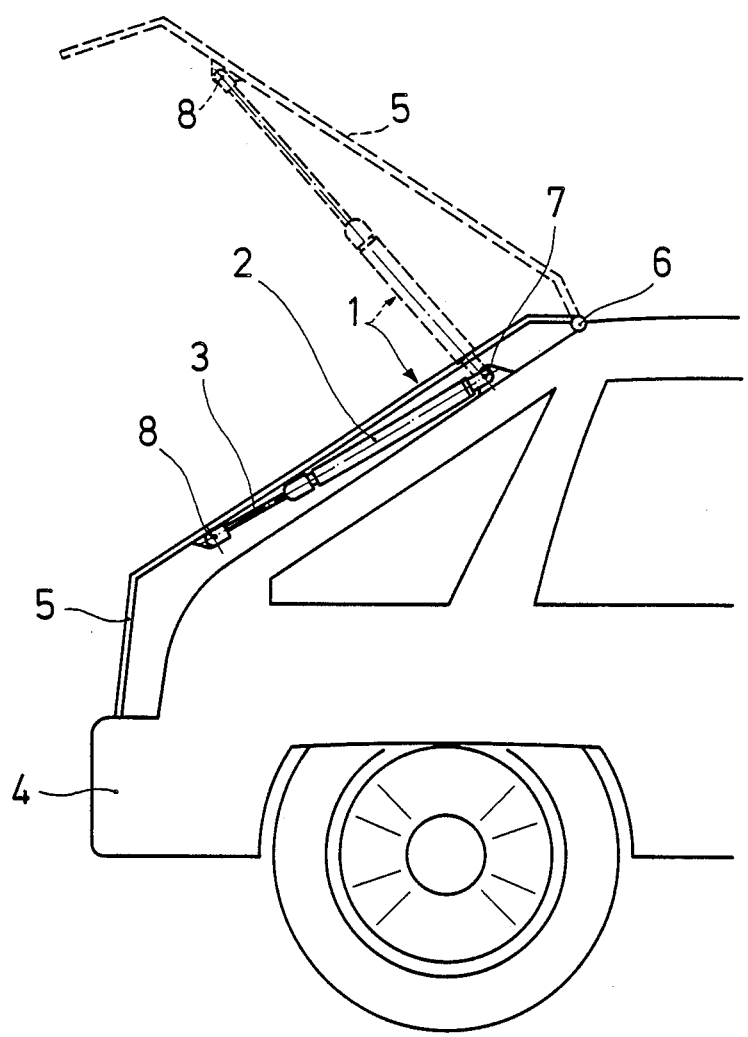
FIG. 1 shows a construction assembly of this invention as a part of a motor vehicle.

In FIG. 1, a gas spring 1 is at 7 hingedly connected to a basic construction unit, namely the framework 4 of a motor vehicle. At 8, the gas spring is hingedly connected to a movable construction element, namely a construction element 5. The gas spring 1 comprises a cylinder 2 and a piston rod 3. The cylinder 2 is filled with pressurized gas so that an outwardly directed spring force is exerted on the piston rod 3. The trunk cover 5 is pivotally connected to the framework 4 by hinges 6. The connections at 7 and 8 may be ball-and-socket connections as illustrated in German Offenlegungsschrift No. 29 42 800, corresponding to U.S. Pat. No. Specification Re. 31,635. The ballsockets are in such case fixed to the bottom of cylinder 2 and the outer end of the piston rod 3, respectively, while the ballheads are fixed to the framework 4 and the construction element 5, respectively. FIG. 1 shows the closed position of the construction element in full lines and the fully opened position of the construction element in dotted lines. In the fully opened position, the piston rod 3 is in its outermost position with respect to cylinder 2, which outermost position is defined by internal abutments of the gas spring. In this position, only the weight of the trunk cover 5 is transmitted into connection 8.

Figure 2:
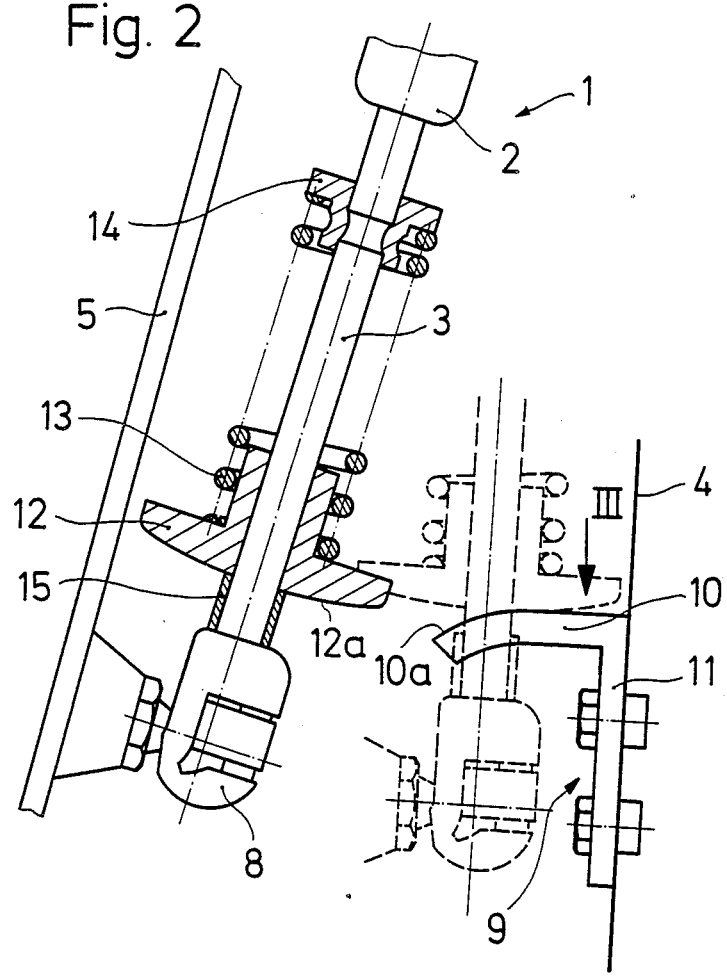
FIG. 2 shows a connection between a gas spring and a construction element according to a first embodiment.
Figure 3:
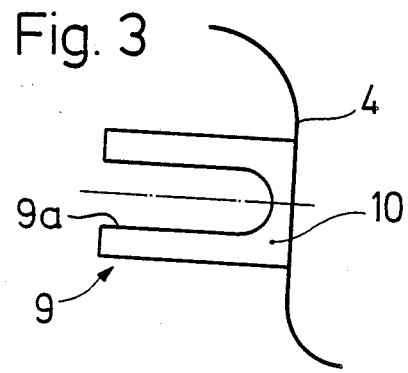
FIG. 3 shows a detail of FIG. 2 according to line III of FIG. 2.

In FIG. 2, reaction force control means are generally designated by 9. These reaction force control means are designed as reaction force support means. They comprise a first abutment member 10 which is fixed to the framework 4 by a flange 11. The abutment member 10 has the U-shape as indicated in FIG. 3, with a slot 9a to receive the piston rod 3 in the fully closed position of the trunk cover 5. The abutment member 10 and its flange 11 are preferably a unitary stamped metal part. A further abutment member 12 is slidably mounted on the piston rod 3. A helical spring 13 urges the abutment member 12 against a spacer sleeve 15. The spring 13 is supported by an annular member 14, axially supported by piston rod 3. FIG. 2 shows in the left-hand illustration (solid lines) the position of the gas spring shortly before the construction element arrives at its closed position, and in the right-hand illustration (dotted lines) the position of the gas spring when the construction element 5 has arrived at its fully closed position. The abutment members 10 and 12 carry respective engagement faces 10a and 12a which extend generally transversely of the gas spring axis.

During transition from the left-hand position of FIG. 2 to the right-hand position of FIG. 2, the abutment member 12 engages abutment member 10, so that abutment member 12 is moved upwards in FIG. 2 and the spring 13 is compressed. The engagement faces 12a and 10a are sloped such as to effect a progressive compression of spring 13 when the gas spring 1 is moved from the left-hand position of FIG. 2 towards the right-hand position. The spring force of spring 13 in the right-hand position of FIG. 2 is directed against the spring force to which the piston rod 3 is subjected to by the pressurized gas within cylinder 2. So the reaction force acting on the connection means 8 is equal to the difference of the spring force of the gas spring and the spring force of the compressed spring 13. By suitable dimensioning of the spring 13 and positioning of the abutment member 10, it may be achieved that the above-mentioned difference is zero and no reaction force occurs at 8 when the construction element is in the right-hand position of FIG. 2. The slot 9a receives the spacer sleeve 15 in the right-hand position of FIG. 2.

Figure 4:
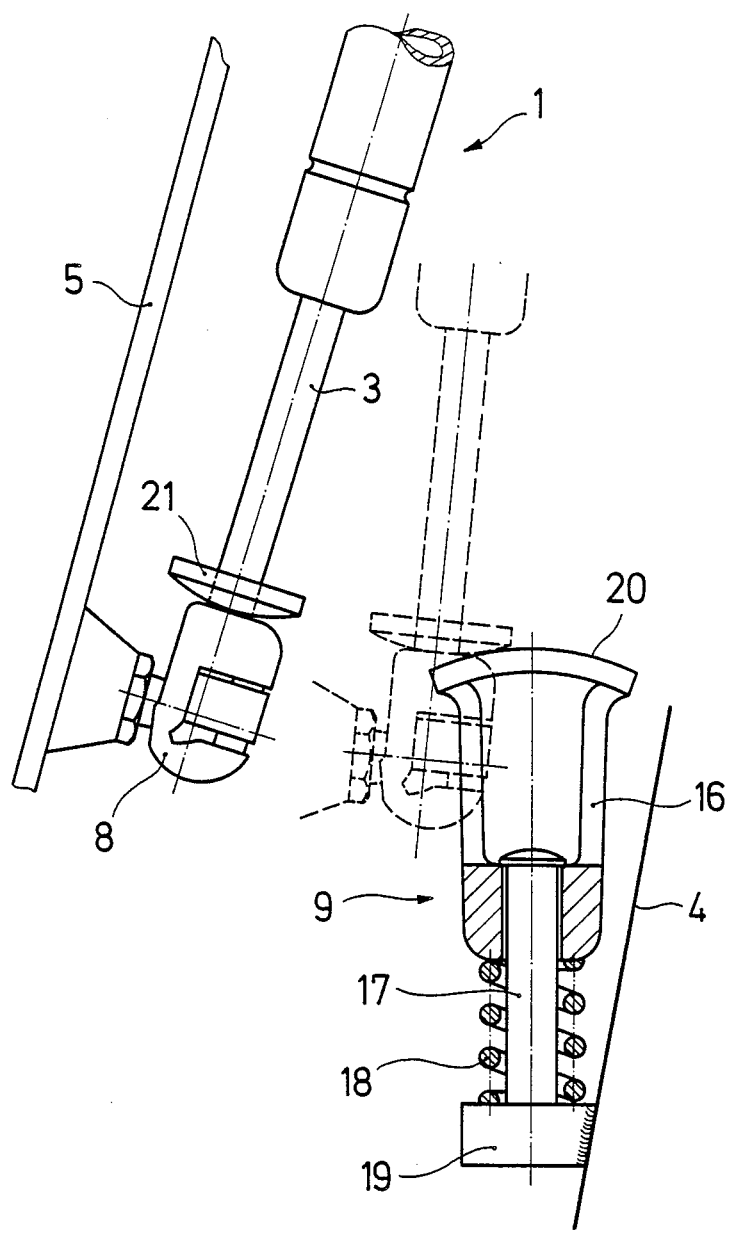
FIG. 4 shows the connection between the gas spring and a construction element according to a second embodiment.

According to FIG. 4, the abutment member 21 is axially fixed on the piston rod 3. The abutment member 20 is slidably mounted on a pin 17 which is fixed to a support member 19, welded to framework 4. A helical compression spring 18 is provided between the abutment member 20 and the support member 19. The abutment member 20 is carried by a cage member 16 adapted to receive the connection means 8 in the fully closed position of the trunk cover 5. When the construction element 5 moves from the left-hand position in FIG. 4 to the fully closed right-hand position, the abutment members 21 and 20 engage each other so that the spring 18 is compressed. The spring force of spring 18 acts in opposite direction as compared with the spring force acting on piston rod 3, so that the resulting reaction force acting on connection 8 is reduced, possibly, zero.

In the embodiment of FIG. 5, the connection between piston rod 3 and construction element 5 comprises a mounting bracket 24 rigidly secured to trunk cover 5 and a lever 26 pivotally mounted on the mounting bracket 24. The piston rod 3 is pivotally connected at 25 to the lever 26. In an intermediate position of the trunk cover 5, as shown in FIG. 5, the lever 26 is held in a terminal position by engagement of stop members 26a and 26b. The stop member 26a is fixed to lever 26, whereas stop member 26b is fixed to the mounting bracket 24. So the spring force of gas spring 1 is transmitted to the trunk cover 5 by stop members 26a, 26b and the weight of the trunk cover 5 is compensated for. A support roller 22a is fixed to the framework 4 by a carrier 22. A cam 26c is provided on lever 26. When the construction element 5 approaches the closed position as shown in FIG. 6, the cam 26c engages the support roller 22a and lever 26 is rotated counterclockwise. So the stop members 26a, 26b are disengaged and the spring force of gas spring 1 is substantially transmitted to the support roller 22a by cam 26c. No substantial reaction force is transmitted to the trunk cover 5 if the support roller 22a and the pivot axis 25 are aligned along the axis of the piston rod as shown in FIG. 6.

Figure 8:
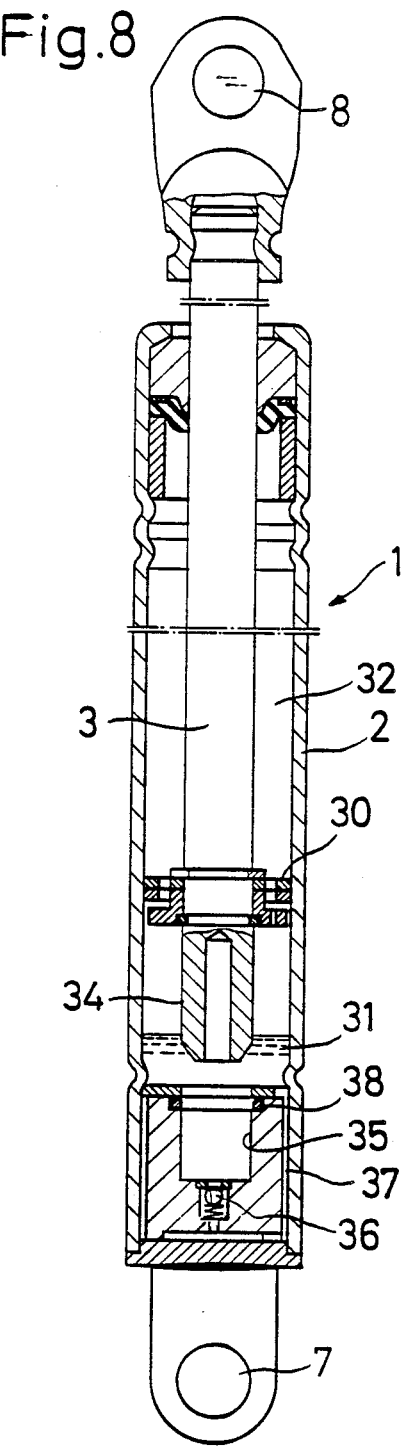
FIG. 8 shows a gas spring to be used in the construction according to FIG. 7.

In the embodiment of FIG. 7, a gas spring, (as shown in FIG. 8) is used. This gas spring comprises a cylinder 2 and a piston rod 3. A damping piston 30 is fixed to piston rod 3 within cylinder 2. The cylinder 2 is partially filled with a liquid 31 and partially with a volume of gas 32. The volume of gas 32 exerts an outwardly directed expelling force on the piston rod 3. Piston rod 3 is provided with a piston rod extension 34. This piston rod extension 34 enters into a chamber 35 at the bottom of cylinder 2 when the piston rod 3 reaches its innermost position corresponding to the closed position of trunk cover 5 in FIG. 1. When the extension 34 enters into chamber 35, the liquid present in chamber 35 is expelled out of chamber 35 through a non-return valve 36 and a conduit 37 towards the working space of cylinder 2. The chamber 35 is sealed against extension 34 by a sealing ring 38.

As soon as the piston rod 3 moves for a short way out of chamber 35, the pressure within chamber 35 is decreased and the expelling force acting on piston rod 3 is reduced and becomes zero. For returning piston rod 3 towards its outermost position, a certain withdrawing force must be exerted on piston rod 3.

In FIG. 7, the piston rod 3 is again pivotally connected at 125 with a lever 126 which is pivotally connected to mounting bracket 124. The stop means 126a, 126b delimit again the pivot-movement of lever 126, so that in the partially opened position of the trunk cover 5 the spring force of the gas spring is transmitted from the piston rod 3 to the trunk cover 5, and the weight thereof is compensated for. When the trunk cover 5 approaches its closed position, the cam 126c rides over a control roller 122a which is carried on the framework by a carrier 122. So the piston rod 3 is moved upwards in FIG. 7. This upward movement causes the extension 34 of FIG. 8 to enter into chamber 35 of FIG. 8. As soon as the cam 126c has overridden the support roller 122a, namely in the closed position according to FIG. 7, the lever 126 is rotated in clockwise direction by the spring force of the gas spring. So the extension 34 of FIG. 8 can move upwards (as shown in FIG. 8) again and the pressure within chamber 35 is descreased, so that the expelling force of the piston rod 3 becomes zero. This means that in the position of FIG. 7 no reaction force at all is transmitted to the trunk cover 5, and simultaneously no reaction force is transmitted at 7 (FIG. 1) to the framework 4. When the trunk cover 5 is to be opened again, a manual force is to be exerted on trunk cover 5, such that the cam 126c rides again beyond the control roller 122a, and even after the cam 126c has overridden the control roller 122a, the manual force must be further exerted on the trunk cover 5 until the extension 34 of FIG. 8 has fully left the chamber 35.

Other systems for locking the piston rod 3 within the cylinder 2 may be used, particularly such locking systems which become locking after a predetermined inward movement of the piston rod and a subsequent short outward movement of the piston rod.

While specific embodiments of the invention have been shown and described in detail to illustrate the application of the inventive principles, it will be understood that the invention may be embodied otherwise without departing from such principles.

The reference numerals in the claims are only used for facilitating the understanding and are by no means restrictive.

What is claimed is:

1. A construction assembly comprising:
   a basic construction unit (4);
   a movable construction element (5) pivotally mounted on said basic construction unit (4) about a horizontal axis (6) and pivotally movable between a first terminal position and a second terminal position;
   at least one gas spring (1) having a longitudinal axis and containing a fluid under pressure, said gas spring (1) including two gas spring components (2, 3), namely a cylinder (2) and a piston rod (3), a first one (2) of said gas spring components (2, 3) being connected to said basic construction unit (4) by first connection means (7) and a second (3) of said gas spring components (2, 3) being connected to said construction element (5) by second connection means (8), said pressurized fluid in said gas spring (1) exerting a force on said construction element (5) so as to compensate at least in part for the weight of said construction element (5) during its movement between said first terminal position and said second terminal position;

first abutment means (10) operatively connected to said basic construction unit (4) and carrying a first engagement face (10a);

second abutment means (12) operatively connected to said second gas spring component (3) and carrying a second engagement face (12a);

said first and second engagement faces (10a, 12a) being shaped and adapted to engage each other along a path of movement generally transverse to the longitudinal axis of said gas spring (1) as said construction element (5) pivotally approaches said first terminal position; and means for permitting displacement of at least one of said first and second engagement faces (10a, 12a) in a direction generally along the longitudinal axis of said gas spring (1) in response to said generally transverse engagement of said first and second engagement faces (10a, 12a), said generally axial displacement of said at least one engagement face (10a, 12a) resulting in a reduction of the force exerted by said gas spring (1) on said construction element (5) when said construction element (5) is in said first terminal position.

2. A construction assembly as set forth in claim 1, wherein at least one of said first and second engagement faces (10a, 12a) comprises a sloped face providing a smooth progressive engagement of said first and second abutment means (10, 12) in response to said construction element (5) approaching said first terminal position.

3. A construction assembly as set forth in claim 1, wherein said second abutment means (12) comprises an annular member (12) surrounding said second gas spring component (3) and carrying said second engagement face (12a), and said first abutment means (10) comprises a U-shaped member with a slot (9a) for receiving said second gas spring component (3) in said first terminal position of said construction element (5).

4. A construction assembly as set forth in claim 1, wherein said displacement permitting means comprises means (13, 14) carried by said second gas spring component (3) of resiliently supporting said second engagement face (12a), and said first abutment means (10) is stationarily carried by said basic construction unit (4).

5. A construction assembly as set forth in claim 1, wherein said displacement permitting means comprises means (16-18) for resiliently supporting said first engagement face (20) on said basic construction unit (4) and said second abutment means (21) is stationarily carried by said second as spring component (3).

6. A construction assembly as set forth in claim 1, wherein:

said second connection means (24, 26) includes a first pivotal connection to said construction element (5) and a second pivotal connection (25) to said second gas spring component (3);

said displacement permitting means (26, 26a, 26b) includes a lever member (26) pivotally connected between said first and second pivot connections and first and second stop members (26a, 26b) carried by said lever member (26) and said construction element (5), respectively, for limiting pivotal movement of said lever member (26) about said first pivot connection in a direction away from said first gas spring component (2);

said lever member (26) further comprises said second abutment means and carries said second engagement face (26c), said second engagement face (26c) engaging said first engagement face (22a) as said construction element (5) approaches said first terminal position so as to rotate said lever (26) about said first pivot connection in the direction towards said first gas spring component (2) and thereby cause said second gas spring component (3) and said first gas spring component (2) to move inwardly relative to each other.

7. A construction assembly as set forth in claim 6, further comprising means (34-38), responsive at least in part to said relative movement of said second gas spring component (3) and said first gas spring component (2), for suppressing at least in part the force of said gas spring (1).

8. A construction assembly as set forth in claim 7, wherein:

said first and second engagement faces (22a, 26a) are shaped to cause, upon the engagement thereof as said construction element (5) approaches said first terminal position, a predetermined inward movement of said second gas spring component (3) and thereafter, upon further movement of said construction element towards said first terminal position, a predetermined outward movement of said second gas spring component (3); and said force suppressing means (34-38) is responsive to said inward movement and said outward movement to cause said suppression of the force of said gas spring (1).

9. A construction assembly as set forth in claim 6, wherein said first and second abutment faces (22a, 26c) are in mutual engagement and said first and second stop members (26a, 26b) are out of engagement when said construction element (5) is in said first terminal position.

10. A construction assembly as set forth in claim 1, wherein said second gas spring component is said piston rod (3).

11. A construction assembly as set forth in claim 1, wherein said basic construction unit is the framework (4) of a motor vehicle and said movable construction element is one of a trunk cover (5) and an engine hood of said motor vehicle.

* * * * *

UNITED STATES PATENT AND TRADEMARK OFFICE
CERTIFICATE OF CORRECTION

PATENT NO. : 4,973,097

DATED : Nov. 27, 1990

INVENTOR(S) : Hosan et al.

It is certified that error appears in the above-identified patent and that said Letters Patent is hereby corrected as shown below:

Col. 2, line 57, "obtain" should read --obtain a--. Col. 3, line 42, "construction element" (2nd occurrence) should read --trunk cover--; line 61, "construction element" should read --trunk cover; line 65, "construction element" should read --trunk cover; line 68, "construction element" should read --trunk cover--. Col. 4, line 1, "construction element" should read --trunk cover--; line 17, "construction element" should read --trunk cover--; lines 28-29, "construction element" should read --trunk cover--; line 30, "construction element" should read --trunk cover--; line 31, "construction element" should read --trunk cover--; line 52, "construction element" should read --trunk cover--, lines 54-55, "construction element" should read --trunk cover--.

UNITED STATES PATENT AND TRADEMARK OFFICE
CERTIFICATE OF CORRECTION

PATENT NO. : 4,973,097

DATED : Nov. 27, 1990

INVENTOR(S) : Hosan et al.

It is certified that error appears in the above-identified patent and that said Letters Patent is hereby corrected as shown below:

Col. 5, lines 8-9, "construction element" should read --trunk cover;

lines 20-21, "construction element" should read --trunk cover--;

line 45, "construction element" should read --trunk cover--.

Col. 7, line 49, "of" should read --for--.

Signed and Sealed this

Twenty-first Day of July, 1992

Attest:

DOUGLAS B. COMER

Attesting Officer

Acting Commissioner of Patents and Trademarks